Figure 1:
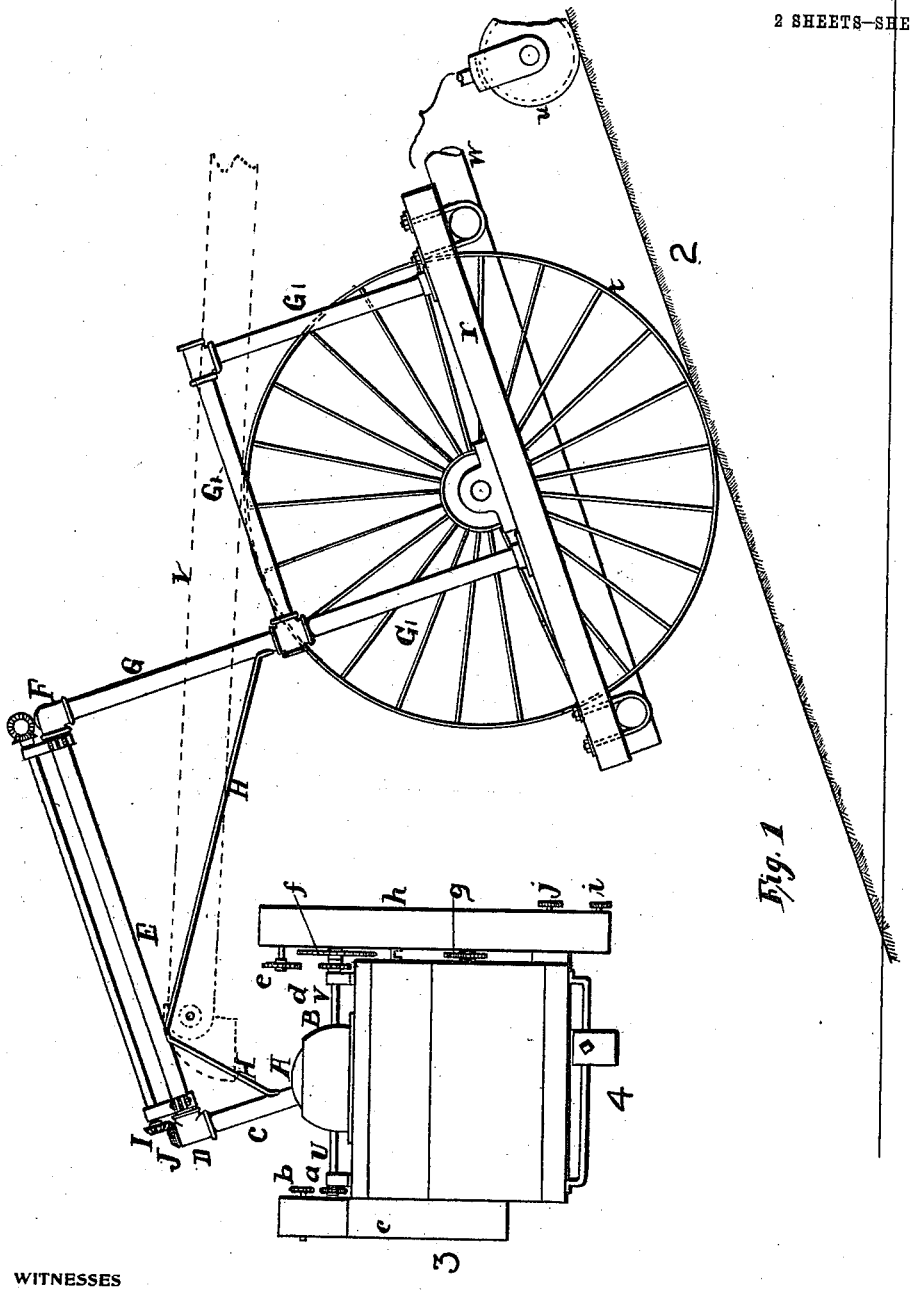

R. S. JAQUES.
THRESHING MACHINE.
APPLICATION FILED JAN. 21, 1910.

976,263.

Patented Nov. 22, 1910.
2 SHEETS—SHEET 1.

WITNESSES
Theodore T. Fitch
E. C. Thompson.

INVENTOR
Rufus S. Jaques.
BY
Edward P. Thompson
ATTORNEY

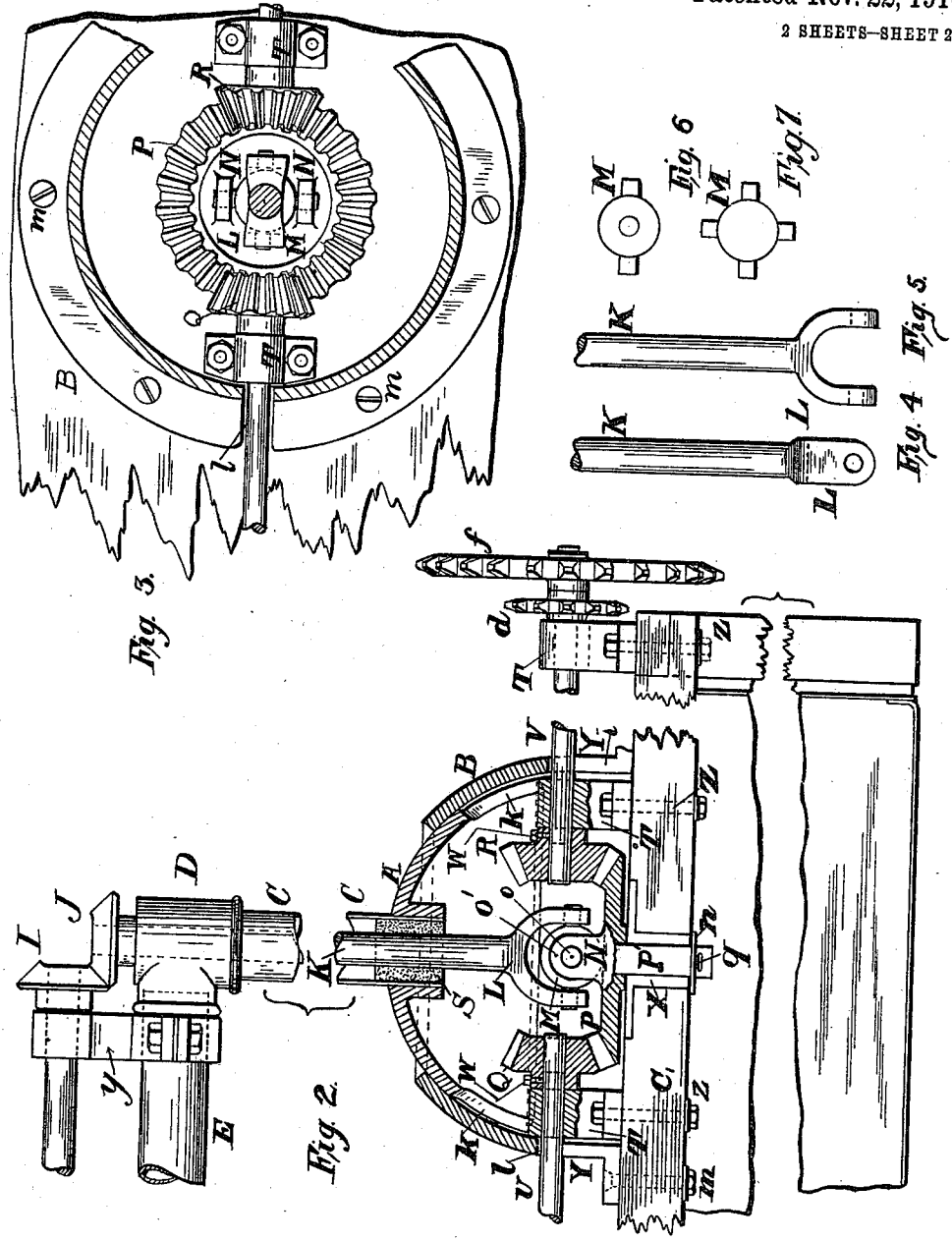

UNITED STATES PATENT OFFICE.

RUFUS S. JAQUES, OF SPOKANE, WASHINGTON.

THRESHING-MACHINE.

976,263.

Specification of Letters Patent.   Patented Nov. 22, 1910.

Application filed January 21, 1910. Serial No. 539,391.

*To all whom it may concern:*

Be it known that I, RUFUS S. JAQUES, a citizen of the United States of America, and resident of Spokane, in the county of Spokane and State of Washington, have invented certain new and useful Improvements in Threshing-Machines, of which the following is a specification.

My invention relates generally to a combined harvester machine, which cuts, threshes, cleans and sacks the grain; and particularly to the suspension and operation of the cleaner.

The object of the invention is to automatically maintain the cleaner horizontal, whether the harvester is traveling up or down hill, or along the side slope of a hill.

The broad conception comprises a ball and socket suspension of the cleaner from the frame of the harvester, and a universal joint in the socket for communicating motion from the drive wheel of the harvester to the cleaner, a pipe frame supporting the cleaner and containing the shafts which communicate motion to and from the universal joint. By the term cleaner, I mean what is also called a separator body.

My invention is considered an improvement over other constructions intended to keep the cleaner level in one direction only, on rough ground, by means, as heretofore proposed, of a rigid rod and pivot suspension. In some countries, for example, Eastern Washington, the farm land is not only hilly, but very rolling in every direction so that the thresher is apt to tip in every imaginable direction during transit.

In the drawings, Figure 1 is an elevation of so much of the construction as involves my invention, and such other adjuncts as will assist to explain the conception. Fig. 2, is a view, partly as a central section through the suspension and driving device. Fig. 3 is a plan of the gears for the universal joint, other parts being broken away. Figs. 4 and 5 show different views of a detail. Figs. 6 and 7 show different views of another detail.

In Fig. 1, the driver $t$ is represented as going down hill 2, while the cleaner 3 remains in a horizontal position, although the slope of the hill is fully twenty degrees from a horizontal line. $u$ is the steering wheel, the parts for connecting the same to the harvester being broken away. $w$ is the tongue, held by the harvester truck $r$. A is a ball fixed to a frame formed of pipes C, E, and G, and connecting elbows D and F, and a brace H, said frame extending from the three sided frame $G^1$, which is carried rigidly by the truck $r$. B is a socket containing the hollow ball A, and fixed to the cleaner 3. The weight of the cleaner 3, causes it to remain horizontal, usually, but I also provide an adjustable weight 4, which is attached to the lower side of the cleaner 3. I and J represent the bevel gearing for communicating motion from the harvester to the member K of a universal joint L M N. The outer spherical surface of the ball A, and the inner spherical surface of the socket B have coinciding centers at the level O, which coincide also with the center of the universal joint. The point O' of intersection of the axes of the bevel wheels P, Q, and R, driven by the universal joint, is above the center O, although this is not essential. U and V are the shafts, respectively, for the bevel wheels Q and R, the bevel wheel P having a shaft P' in a bearing X, for communicating motion from the member N of the universal joint to the bevel wheels Q and R.

The invention does not include the parts operated by the shafts U and V, and therefore some parts of the device are purposely omitted.

Sprocket wheels $a\ b\ e\ f$ are indicated as elements involved in the operation.

The slots $k$ in the hollow ball A are for the purpose of allowing the cleaner to swing to some definite angle without interference with the boxes T, which respectively support the shafts U and V. The slots 1 in the socket B are to allow the socket to be moved away from the shafts U and V with the ball A and frame element C, when the gear J is taken off of the shaft K, whereby the whole cleaner may be removed by unscrewing the bolts $m$, which fasten the socket B to the cleaner frame $c$.

As far as my invention is concerned, the operation consists merely in the cleaner 3 always remaining horizontal while the driving wheel is rolling over hilly, or rolling ground.

Parts shown but not described, have nothing to do with my invention.

I claim as my invention;—

1. In a threshing machine, the combination of a cleaner, gearing for communicating motion to the cleaner, gearing to be driven by the first named gearing, a universal joint connecting the two said gearings, and a hollow ball and socket suspension device containing said joint and second named gearing.

2. In a threshing machine, the combination of a frame, a ball carried by said frame, a cleaner supported by said ball, a socket attached to said cleaner, a universal joint within said socket and ball, and shafts carried by said frame for driving said universal joint.

3. In a threshing machine, the combination of a frame, a ball and socket joint suspended therefrom, a gear on said frame, a gear in said joint, and a shaft connecting said two gears.

4. In a threshing machine, the combination of a frame, a cleaner, a single support on said frame, and a universal joint between said cleaner and said frame by which said cleaner is suspended and maintained horizontal during the tilting of said frame in any or all directions.

RUFUS S. JAQUES.

Witnesses:
LOUIS MARTIN,
L. J. CORBETT.